May 21, 1957 W. C. HOWEY 2,793,253

TELEGRAPHONE RECORDING AND REPRODUCING SYSTEM

Filed Oct. 20, 1950 3 Sheets-Sheet 1

INVENTOR.
Walter C. Howey
BY
Ezekiel Wolf
his Attorney

INVENTOR.
Walter C. Howey
BY Ezekiel Wolf
his Attorney.

TELEGRAPHONE RECORDING AND REPRODUCING SYSTEM

Filed Oct. 20, 1950 3 Sheets-Sheet 3

INVENTOR.
Walter C. Howey
BY
Ezekiel Wolf
His Attorney

United States Patent Office 2,793,253

Patented May 21, 1957

2,793,253

TELEGRAPHONE RECORDING AND REPRODUCING SYSTEM

Walter C. Howey, Boston, Mass.; Winfield S. Brooks, James P. Murphy, and Edwin M. Howey, executors of said Walter C. Howey, deceased Application October 20, 1950, Serial No. 191,099

12 Claims. (Cl. 179—100.2)

The present invention relates to telegraphone method and apparatus for sound recording and transcription using para-magnetic tape which may be continuously operated over long periods of time to meet the severest requirements of radio and telephone recorders, and reproducers in commercial, military and aviation service where durability of the apparatus and high fidelity of reproduction is required.

A further purpose of the present invention is to provide a device which will function at slower tape speeds than hithertofore used, slower than is possible in wire or photographic practice. In fact, as slow as five feet of sound track per minute or less.

A still further purpose of the present invention is to provide a construction wherein the moving tape is held against the erase and recording heads by an element moving substantially at the same velocity with the tape rather than by such elements as pressure or friction pads.

A still further purpose of the present invention is the use of a tape on which there is formed two parallel sound tracks by two sets of recording and erasing poles, one set positioned in the head to produce and erase when the tape is moving in one direction and the other set in an offset position to record and erase on a parallel second track on the tape when it is moving in the other direction. In addition to this the apparatus of the present invention provides for automatically shifting from recording or reproduction from one track to the other, automatically winding of the tape at high or low speeds, automatic brakes and the automatic reversing of the motor controlling the direction of the movement of the tape.

Another purpose of this invention is a telephone recorder which automatically starts when a telephone receiver is lifted, shuts off when the telephone is replaced and during the recording automatically introduces a warning signal in accordance with the regulations of the Federal Communications Commission consisting of a 1400 cycle audio-frequency "beep" repeated every 15 seconds into the telephone circuit. Other and further merits of the present invention will be more fully illustrated in the specification as set forth below when taken in connection with the drawings illustrating an embodiment of the same in which:

Figure 1:
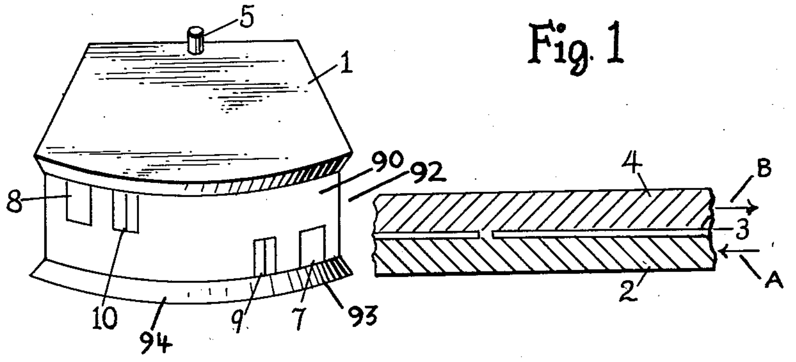
Figure 1 shows somewhat schematically a perspective view of a pivoted telegraphone head, and fragmentary section of tape in accordance with the present invention.

As indicated in Figure 1, the telegraphone head 1 is pivoted for horizontal movement by a freely pivoted axis or shaft 5 with the surface 90 of the head formed as an arc of a circle coaxially with the shaft 5. The surface 90 has a width corresponding to the width of the tape 3 and in the surface there is imbedded two pairs of poles 9 and 10, each pole face occupying less than half the width of the surface and positioned with one side of the pole face near or at the side edges of the surface and flush with it. The tape 3 is substantially the width of the curve surface 90 and is positioned such that it covers the width of the surface 90. The result is that the pair of pole faces 9 will energize only one side section of the tape as indicated by the section 2 while the pair of pole faces 10 will energize the other side section as indicated by the strip 4 thereby setting up two parallel tracks 2 and 4 on the tape. An erasing magnet 7 is positioned adjacent the pole face 9 and a similar erasing magnet 8 is positioned adjacent the pole face 10. As indicated more clearly in Figures 2 and 3, when the tape 3 is moving in the direction of the arrow A the tape first comes in contact with the erasing magnet 7 and then the recording and reproducing magnet pair of poles 9 on the lower section 2 tape as viewed in Figure 1.

When the tape is moving in the direction of the arrow B (Figure 1) then the portion 4 of the tape on the upper side as viewed in Figure 1 comes first in contact with the erasing pole 8 and then in contact with the recording and reproducing poles 10. The head 1 may be constructed in the usual manner by enclosing the pole faces in a hard rubber insulated head 92 which is protected by shielding elements 93 covering the head and providing bevel flanges 94 bordering the edge of the curve surface 90 against which the tape is held in contact at the surface. The space between the tracks 2 and 4 on the tape 3 may be approximately or substantially $\frac{1}{32}$ of an inch in width. The erasing magnets 7 and 8 which are outwardly of the recording and reproducing magnets 9 and 10 on the arcuate surface of the head may be energized by a single coil 12 through which a combination of currents may be passed to effect complete erasure as disclosed in my co-pending application, Serial No. 743,931, filed April 25, 1947, patented April 10, 1951, No. 2,548,109. The pair of poles 9 and 10 may also be energized by a single core 14 with the magnetic support of the pole pairs 10 and 13 connected in parallel. Individual series or parallel excitation may also be used. The erase magnet 7 and 8, it will be noted from the above description and the drawings, is such that the pole piece 7 erases prior to the recording of the magnet 9 and pole piece 8 erases prior to recording of the pole piece 10. The recording and reproducing magnet 13 is wound to provide a pair of opposite poles for the pair of pole pieces 9 and also for the pair of pole pieces 10.

This complete structure is preferably made up of laminated elements with one or both of the side surfaces adjacent the pole extremeties of each pair coated with copper or some other highly conductive, non-magnetic material. This provides a pair of poles which cuts down the residual magnetism and also permits the gap to be accurately controlled by the amount of copper which is deposited by electroplating between the inner faces of the gap. It also permits welding and soldering without effecting the magnetic properties of the pole pieces. A gap of this nature will permit faithful reproduction with extremely slow tape speeds as are obtained in the present invention.

Figure 2:
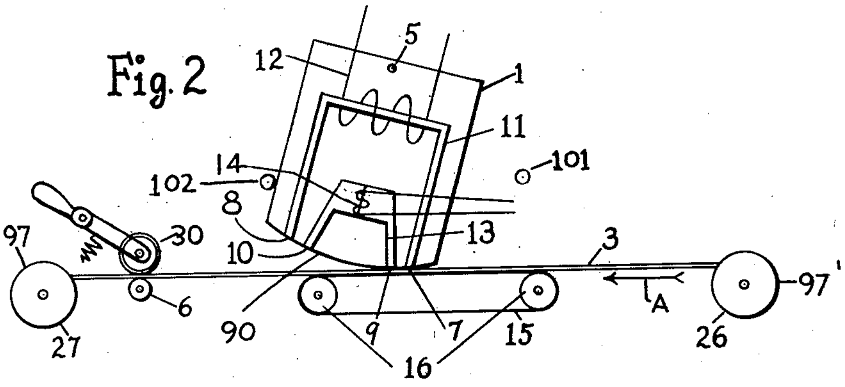
Figure 2 shows diagrammatically an arrangement of the present invention with the head in one position.
Figure 3:
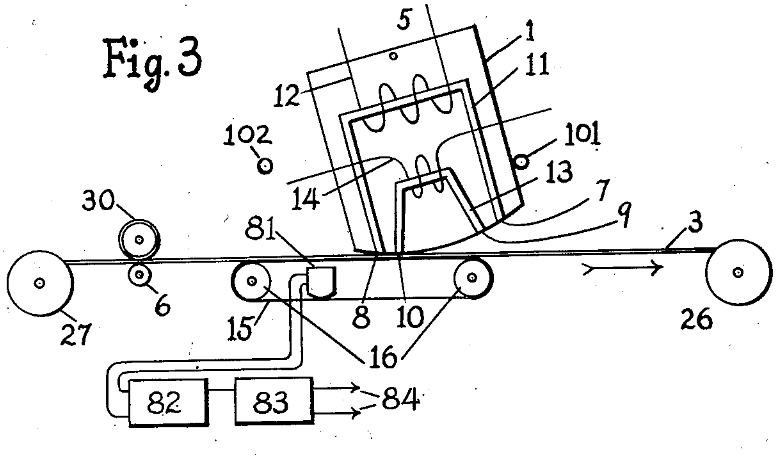
Figure 3 shows a view of the same invention with the head in a second position including a further detail of the invention.
Figure 4:
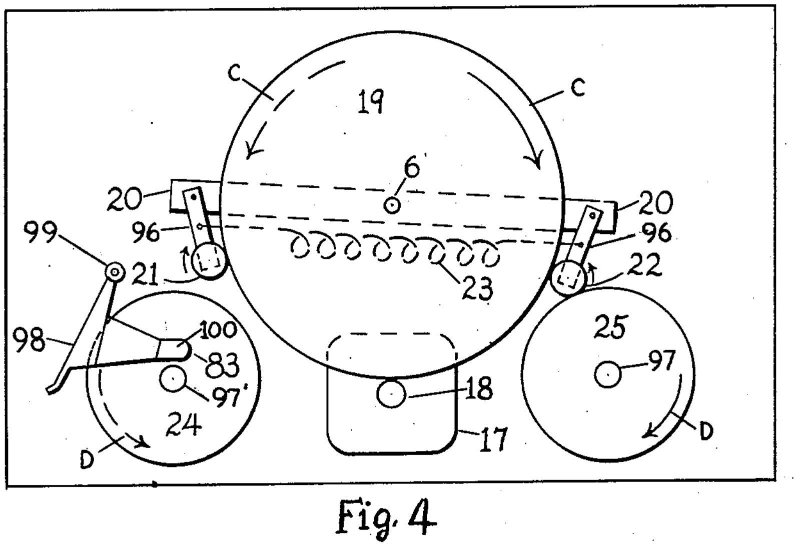
Figure 4 shows diagrammatically a plan view of the underside of the apparatus as referred to the arrangement shown in Figures 2 and 3.

The functioning and operation of the system will be more thoroughly appreciated in connection with the arrangement shown in Figures 2, 3, 4, and 6. In Figure 4, there is shown a supporting plate 95 upon which the operating mechanism is mounted for supporting and driving the different elements shown in Figures 2 and 3. Referring more particularly for the moment to Figure 4, there is provided a driving motor 17 which operates a small pinion or shaft 18 in contact with the flywheel 19 which drives the shaft 6' which projects through the plate 95 and on its other side drives the friction wheel 6 (Figures 2 and 3) pivoted to the same shaft 6' but freely mounted on it is a rocker arm 20 which has pivoted to it at its ends arms 96 which carry two freely rotating idlers 21 and 22 at their ends. The arms 96 are drawn together by means of a spring 23 so that both idlers 21 and 22 are always mounted in contact with the flywheel 19. When the flywheel 19 rotates in the direction of the arrow C, the arm 20 tends to rotate clockwise and bring the idler 22 in contact with the friction wheel 25 which is also mounted to rotate by means of the shaft 97 in the plate 95. As indicated in Figure 4, when the flywheel 19 is rotating in the direction of the arrow C, the friction wheel 25 will rotate in the same direction as indicated by the arrow D. When the flywheel 19 is rotated in the direction of the arrow C' and the friction wheel 24 and its shaft 97' will rotate in the direction of the arrow D'. The motor 17 is reversed in operation as will be explained below so that the flywheel 19 may be made to rotate in either of the arrow directions as indicated. The shaft 97' is the spool wind shaft which drives the spool 26 for winding the tape 3 in the direction of the arrow B and the shaft 97 is the spool wind shaft for winding the spool 27 in the direction of the arrow A referring to Figure 2. The driving wheel 6 rotates in correspondence with the rotation of either the spool 26 or 27, whichever happens to be driven through the flywheel 19. An idler 30 which may be held away from the tape 3 and wheel 6 by depressing hardly 30' (Figure 2) normally makes contact with the tape to provide a sturdy drive. A friction wheel 24 has applied to it a friction break 98 pivoted to the plate 95 at 99 with an arm 100 extending over the top surface of the wheel 24 so that when the wheel rotates in a direction opposite to the arrow D', the break 98 will be drawn in towards the edge of the wheel and provide a gentle breaking action to the winding of the tape. If the tape is wound by the spool 24 or 25, the winding will be rapid but extremely slow when wound by the driving wheel 6. In Figure 2, the tape will be traveling in the direction of the arrow A so that as the shaft 97 is being rotated for winding the spool 27, the tape will be held taut by the break action of the break 98. When the spool 97' is driving or rotating to wind the tape, the tape will be held taut in its full section from the driving capstan shaft 6 to the spool 26, since these two elements are driven together with a slight tension exerted by the shaft 97 on account of its friction drive.

In Figure 2 when the tape is traveling in the direction of the arrow A, the head 1 is swung to the left as shown in Figure 2 in a clockwise direction. When the tape is traveling in the opposite direction as shown in Figure 3, the head is swung in a counter-clockwise direction as shown in the figure. The tape 3 may be pressed against the head by means of an endless belt supported for rotation by the wheels 16. The belt 15 may be of a friction type and the idlers or wheels 16 on which the belt rotates may exert a slight pressure on the belt by any suitable means.

When the system is used for recording a telephone conversation, the required indication that the speech is being recorded to comply with the Federal Communications Commission regulations is obtained by means of a permanent magnetic record on the friction belt 15 adjacent a magnetic pick-up 81 through which the signal picked up is impressed upon an amplifier 82 which feeds to the output or power amplifier 83 during the time that the telephone is in circuit and the conversation is recorded. This arrangement is shown in Figure 3. In each of the drawings of Figures 2 and 3, there are provided two upwardly extending posts 101 and 102 which limit the motion of the head 1 so that in one case the pole elements 7 and 9 remain tangential and in contact with the tape 3, while in the other position the pole elements 8 and 10 occupy the same relative postion.

Figure 6:
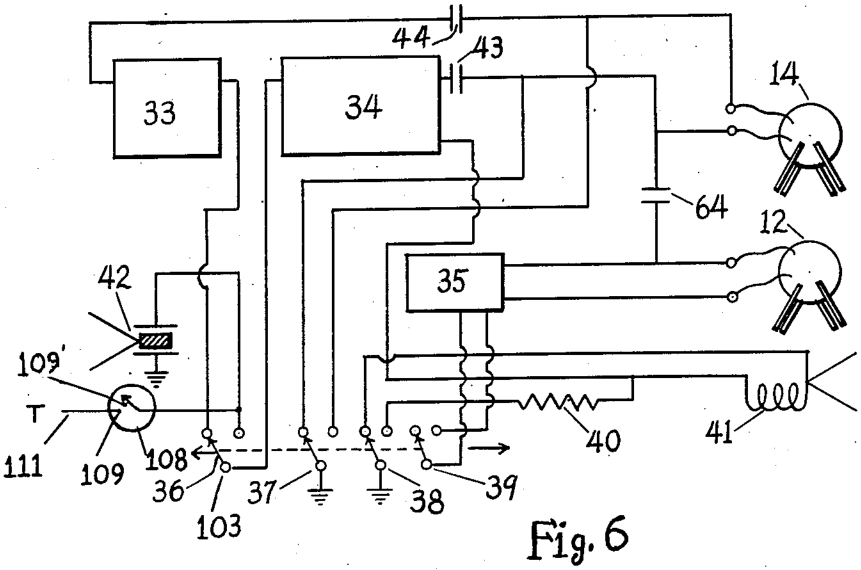
Figure 6 shows a wiring diagram of the system for play-back and recording.
Figure 7:
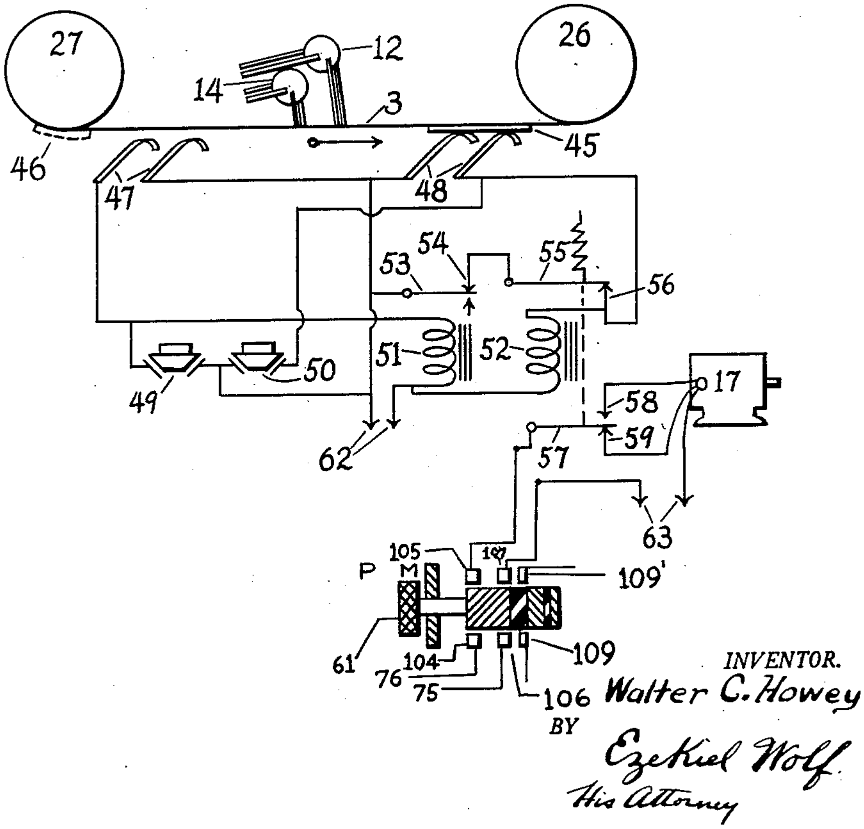
Figure 7 shows a further wiring diagram for automatic reversal of the direction of the motion of the tape.

The operating circuit for the systems described are shown more clearly in Figures 6 and 7. In Figure 6, there is shown a gang switch 103 which operates a plurality of individual switches 36, 37, 38 and 39 in two positions. Swinging the gang switch which is operated manually to the left, the system is in a play-back position, while swinging the switch to the right, the system is in a position for recording. This system includes a pre-amplifier 33, a main amplifier 34, a microphone 42, a loud speaker 41 and shows also the erase coil 12 with a pair of operating poles in place of the poles 7 and 8 and a recording and pick-up coil 15 which operates in connection with the pair of poles 9 and 10.

In addition to the elements above described, the system includes a biasing oscillator 35 operable with the erase coil 12 and capacitors 43, 44 and 64 whose function and utility will be described below. In addition, when the loud speaker is not in circuit, an equivalent dummy load in the resistance or impedance 40 is used for balancing the circuit. The switch 36 in its play-back position connects the pre-amplifier to the main amplifier. In its record position, it connects the microphone 42 to the main amplifier. The switch 37 has two contacts which connect one side or the other side of the coil 14 for recording or reproducing to ground. The switch 38 connects the speaker on one side to ground and on the other side to the equivalent resistance or impedance 40 when the speaker is cut out of circuit. The switch 39 in the play-back position opens the circuit for the biasing oscillator and in the recording position completes the circuit for the biasing oscillator so that past history on the tape may be erased through the erasing head 12. In the position of the switch indicated in Figure 6, it is set up for playing back a record on a tape already made. In this case the record is picked up on the coil 14, passed through the line in which the block condenser is positioned for eliminating direct current to the pre-amplifier 33 through the switch contact 36 to the main amplifier 34 which connects directly to the loud speaker 41 and then to the switch 38 which is grounded, thereby completing a connection through the switch 37 which is also grounded back to the head. In the recording position, wherein the microphone 42 is used and in which case the gang switch 102 is swung to the right, the microphone connects to the main amplifier which is connected to the recording head 14, then through the ground to the switch 37 through the switch 38 and the impedance 40, the other side of which is connected to the main amplifier. In this case the biasing oscillator switch 39 is closed so that the past history is erased by the erase coil 12.

Figure 7 shows the tape reversal mechanism which automatically reverses the rotation of the tape when the tape has come to the end. The tape may also be reversed manually by two manually operated switches 49 and 50. Any suitable arrangement may be employed to provide an automatic indicator when both tracks on the tape have been used up. This may comprise a timing switch which will shut down the motor after a given time during which the spools have been running or the indicator may be provided through a revolution counter means since the tape will always roll up on the spools for the same number of revolutions. When such a counter has gone through two complete rolls of tape, the tape normally would have a complete record and should either be removed for permanent record of the voice recorded or should be erased for new use. Other methods of recording the complete filing of the tape may also be used.

In the arrangement shown in Figure 7, it may be assumed that the spool 27 has become completely wound in which case the spool 26 is unwound and a conductive contact 45 has come beneath the pair of contacts 48. When the spool 26 has become completely wound, the conductive contact 46 shown in dotted lines would come beneath the pair of contact elements 47. In the position shown in Figure 7, the reversal of travel of the tape 3 has just been effected. In this case the conductive contact 45 closes the power through the relay coil 52, thus pulling down the holding contact 55 against the contact 56 to hold the circuit closed in the position shown in the figure. Further the contact 57, 59 is completed which has reversed the motor 17 causing it to drive in the direction of the arrow shown in Figure 7. The conductive strip 45 will then be rolled up on a spool 46 and the travel of the tape will continue until the spool has completely unwound, whereupon the tape 46 will come beneath the contacts 47 completing the circuit to the coil 51 which will deenergize the holding coil 52, thereby allowing the switch blade 57 to fly up in contact with the element 58, thus reversing the rotation of the motor 17 so that the tape 3 will travel in the direction opposite to that of the arrow shown in the figure. The coil 51 has no holding element and this, it will be noted is not necessary.

While the arrangement has just been described, where reversal of the direction of the tape is obtained at the ends of the tape, reversal may also be obtained manually by means of the push button switches 49 and 50. While the tape is running in the direction of the arrow of Figure 7, if it is desired to have it run in the opposite direction, the push button 49 may be pressed, thus completing the circuit through the relay coil 51, opening the circuit for the coil 52 and causing the contact 57 to fly up and complete a circuit through the contact 58.

If the tape 3 is already running in this direction and it is desired to have it run in the direction of the arrow shown in the figure, the push button 50 is pressed in which case the coil 52 becomes energized and the motor rotation reversed. Pressing the button 50 will also complete the holding circuit so that the tape will continue to run in the direction of the arrow until it is again reversed.

A manually operated switch 61 which also operates in connection with the phone is provided for opening the motor circuit so that any time in the operation of the travel of the tape the motor may be stopped for whatever purpose desired.

Figure 5:
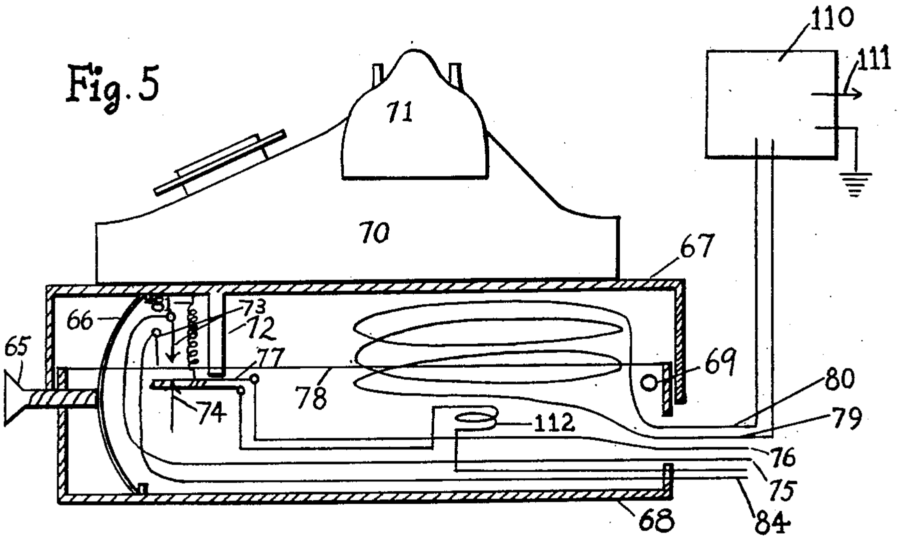
Figure 5 shows the present invention used in combination with a telephone for automatic message recording.

Figure 5 shows diagrammatically a system for an induction telephone pick-up and recording of the conversations on the telephone. Top plate 67 on which the phone box assembly 70 normally rests is hinged at 69 to the bottom case or plate 68. Spring 66 is bowed to force these hinged sections of the cover apart in the desired position which will keep open under normal conditions the switch comprising the contacts 73, fixed to the section 68 and 77 pivoted in the section 68 but tensioned upwards by the spring 81 to keep the contact arm 77 against the end of the post 72. Projecting from the top of the case 67.

When the phone hand set 71 is raised from its cradle the top plate or section 67 of the case is raised by action of spring 66 and the spring 81 draws upward the contact arm 77 making a connection with the contact 73. The contact arm 77 and contact 73 are double pole contact switches operated together for closing separate circuits and when the phone is raised on the cradle they close the "beep" circuit to the leads 84 (Figure 3) and the motor contact circuit through the leads 75 and 76 which goes to the manual switch 61 which in the outward position P connects contacts 104 to 105 and 106 to 107 thereby closing the motor circuit. The switch 108 diagrammatically shown in Figure 6 is also closed. In Figure 7 the switch comprises two contacts 109 and 109' which connects the telephone preamplifier 110 to the record system by the connection 111 to the right contact associated with switch 36 (Figure 6) through the switch 108.

When it is desired to connect the system for telephone recording the operator simply sees that the gang switch 103 is set for recording; that is, thrown to the right and that the manual switch 61 is pulled out to the phone P position. When the operator then takes the phone off the hook the motor 17 will start up and the induction coil 78 together with the "beep" induction coil 112 will be connected in circuit. The "beep" coil will transmit the "beep" over the telephone as received by the pick-up magnet 81 while the voice received at the telephone will be transmitted through the telephone preamplifier 110, the main amplifier 34 and recorded through the coil 14 on the tape.

When the phone conversation is through the operator will reset the switch 61 to the manual position M in which position the circuit will be completed to the motor without the telephone switch.

It will be noticed in Figure 1 that the tape 3 is slotted along the middle except for short connecting places. Such a tape is used primarily for editing the record permitting sections on either side of the tape to be cut out where this is desired. It is not necessary, however, to use a slotted tape to provide two independent records even though the entire tape be made of paramagnetic material.

Having now described my invention, I claim:

1. In a telegraphone system, a telegraphone sound head having an arcuate surface at one side, means mounting the head to turn on an axis coaxial with that of the arcuate surface, a pair of recording and reproducing magnets mounted with their poles substantially flush with the arcuate surface but in different planes perpendicular to said axis, a paramagnetic tape, means for moving said tape over said arcuate surface maintaining substantially tangential frictional contact therewith and means for limiting the turning arc of said arcuate surface for movement of the tape in either direction including means whereby when said tape is moving in one direction contact will be made at the position of one pole of said pair and when moving in the opposite direction contact will be made at the position of the other pole of said pair.

2. In a telegraphone system, a telegraphone sound head having an arcuate surface at one side, means mounting the head to turn on an axis coaxial with that of the arcuate surface, a set of telegraphone magnets comprising an erase magnet and a play-back record magnet having pole faces mounted flush and spaced close together along the arcuate surface, a second set of telegraphone magnets having similarly positioned pole faces mounted flush along said arcuate surface angularly spaced from the first set and offset therefrom, a magnetic tape, means for maintaining the magnetic tape in motion making tangential contact with said arcuate surface over an arc of one or the other sets of pole faces dependent upon the direction of motion of said tape, said magnets of a set being close enough to make contact with the tape in the tangential region and means for limiting the turning arc of said head in both rotational directions.

3. In a telegraphone system, a telegraphone sound head having an arcuate surface on one side, means mounting the head for free limited motion about an axis coaxial with the arcuate surface, a magnetic play back and record pole and an erase pole comprising a set flush with the arcuate surface closely spaced along one side of the arcuate surface and a second set spaced angularly away from the first set along the other side of said arcuate surface, a magnetic tape, means for maintaining substantially tangential frictional contact of the magnetic tape with the arcuate surface of the head, means for moving the magnetic tape in a forward or reverse direction including means whereby said head is automatically selectively positioned with one or the other sets of magnets in contact with said tape.

4. In a telegraphone system, a telegraphone sound head having an arcuate surface on one side, means mounting the head for free limited motion about an axis coaxial with the arcuate surface, a magnetic play back and record pole and an erase pole comprising a set flush with the arcuate surface closely spaced along one side of the arcuate surface and a second set spaced angularly away from the first set along the other side of said arcuate surface, a magnetic tape, means for maintaining substantially tangential frictional contact of the magnetic tape with the arcuate surface of the head, means for reversing the direction of the magnetic tape and means controlled thereby for rotating the head through its limited motion to change from one set of poles in contact with the tape to the other.

5. In a telegraphone system, a paramagnetic tape, a recording and playback head having two sets of poles positioned with respect to said tape to impress and pick up two parallel records longitudinally of said tape, one set associated with one of the records and the other set with the other record, and means operative when the tape is moving over the poles in one direction to select one of said tapes with its associated record and to select the other of said tapes with its associated record when the tape is moving over the poles in the reverse direction and means whereby the first-mentioned means is made operative by the motion of the tape.

6. In a telegraphone system, a telegraphone sound head having an arcuate surface at one side, means mounting the head for limited turning in either direction on an axis coaxial with that of the arcuate surface, a pair of recording and reproducing magnets mounted with their poles substantially flush with the arcuate surface but in different planes perpendicular to said axis, a paramagnetic tape, means for moving said tape over said arcuate surface maintaining substantially tangential frictional contact therewith including an endless belt bearing against the opposite surface of the tape making contact with said arcuate surface in a limited section of the tape where the arcuate surface is positioned whereby when said tape is moving in one direction contact will be made at the position of one pole of said pair and when moving in the opposite direction contact will be made at the position of the other pole of said pair.

7. In a telegraphone system, a telegraphone sound head having an arcuate surface at one side, means mounting the head for limited turning in either direction on an axis coaxial with that of the arcuate surface, a pair of recording and reproducing magnets mounted with their poles substantially flush with the arcuate surface but in different planes perpendicular to said axis, a paramagnetic tape, means for moving said tape over said arcuate surface maintaining substantially tangential frictional contact therewith including an endless belt bearing against the opposite surface of the tape making contact with said arcuate surface in a limited section of the tape where the arcuate surface is positioned whereby when said tape is moving in one direction contact will be made at the position of one pole of said pair and when moving in the opposite direction contact will be made at the position of the other pole of said pair, said endless belt having a magnetic record of a signal thereon and a reproducing system for picking up said signal and impressing it on a telephone circuit.

8. In a telegraphone system, a telegraphone sound head having an arcuate surface at one side, means mounting the head for limited turning in either direction on an axis coaxial with that of the arcuate surface, a pair of recording and reproducing magnets mounted with their poles substantially flush with the arcuate surface but in different planes perpendicular to said axis, a pair of spools and a paramagnetic tape which is adapted to be wound on either one of the spools and unwound from the other, means for drawing said tape in the direction of either spool including means automatically selectively driving the spool towards which the tape is moving in a relation to exert a slight tension on the tape between the driving means and said spool, said tape being positioned to maintain tangential contact against said arcuate surface in the region of one of said magnets when the tape is moving in one direction and in the region of the other magnet when the tape is moving in the other direction.

9. In a telegraphone system, a pivoted magnetic pick-up and record head having pairs of offset poles therein, a paramagnetic tape, means mounting the tape to be drawn across the head with one half of the tape registering with one pair when the tape is moving in one direction and the other half with the second pair when the tape is moving in the opposite direction, means for drawing said tape across said head and means partly mounted on the tape at desired positions for reversing the direction of the movement of the tape.

10. In a telegraphone system, a pivoted magnetic pick-up and record head having pairs of offset poles therein, a paramagnetic tape, means mounting the tape to be drawn across the head with one half of the tape registering with one pair when the tape is moving in one direction and the other half with the second pair when the tape is moving in the opposite direction, means for drawing said tape across said head and means partly mounted at the ends of the tape for reversing the direction of the movement of the tape.

11. In a telegraphone system, a pivoted magnetic pick-up and record head having pairs of offset poles therein, a paramagnetic tape, means mounting the tape to be drawn across the head with one half of the tape registering with one pair when the tape is moving in one direction and the other half with the second pair when the tape is moving in the opposite direction, means for drawing said tape across said head and means manually operable for reversing the direction of the rotation of the tape during its movement.

12. In a telegraphone system, a pivoted magnetic pick-up and record head having pairs of offset poles therein, a paramagnetic tape, means mounting the tape to be drawn across the head with one half of the tape registering with one pair when the tape is moving in one direction and the other half with the second pair when the tape is moving in the opposite direction, means for drawing said tape across said head, means partly mounted at the ends of the tape for reversing the direction of the movement of the tape and means manually operable for reversing the direction of the rotation of the tape at will.

References Cited in the file of this patent

UNITED STATES PATENTS

| | | |
|---|---|---|
| 2,069,632 | Thomas | Feb. 2, 1937 |
| 2,328,539 | Greenleaf | Sept. 7, 1943 |
| 2,500,903 | Neff | Mar. 14, 1950 |
| 2,524,063 | Masterson | Oct. 3, 1950 |
| 2,536,030 | Camros | Jan. 2, 1951 |
| 2,547,737 | Blaney | Apr. 3, 1951 |
| 2,549,548 | Zimmerman | Apr. 17, 1951 |
| 2,560,254 | Schickel | July 10, 1951 |
| 2,661,397 | Berens | Dec. 1, 1953 |